United States Patent [19]

Medrano, Jr.

[11] 4,066,288
[45] Jan. 3, 1978

[54] LOAD ADJUSTABLE RELEASE DEVICE

[76] Inventor: Joseph Medrano, Jr., 8 Ipswich Court, Florissant, Mo. 63033

[21] Appl. No.: 698,661

[22] Filed: June 22, 1976

[51] Int. Cl.² .............................................. B66C 1/28
[52] U.S. Cl. ................................................. 294/83 R
[58] Field of Search ................... 294/83 R, 83 A, 84; 278/22

[56] References Cited

U.S. PATENT DOCUMENTS

| 703,713 | 7/1902 | Smith et al. | 294/83 R |
| 3,070,015 | 12/1962 | Ledwith | 294/83 R |

FOREIGN PATENT DOCUMENTS

| 540,971 | 3/1956 | Italy | 294/83 R |

*Primary Examiner*—James B. Marbert
*Attorney, Agent, or Firm*—Nathan Edelberg

[57] ABSTRACT

This quick-release mechanism has a tubular housing in which a spring is compressed by a set of jaws fastened to a plunger within the spring. A detent is adjustably secured to the housing. When the spring is compressed by movement of the jaws far enough to clear the detent, the plunger and jaws will pass through the spring and the plunger and housing are disengaged. The housing and the plunger are the points to which opposing tensile forces are applied.

6 Claims, 4 Drawing Figures

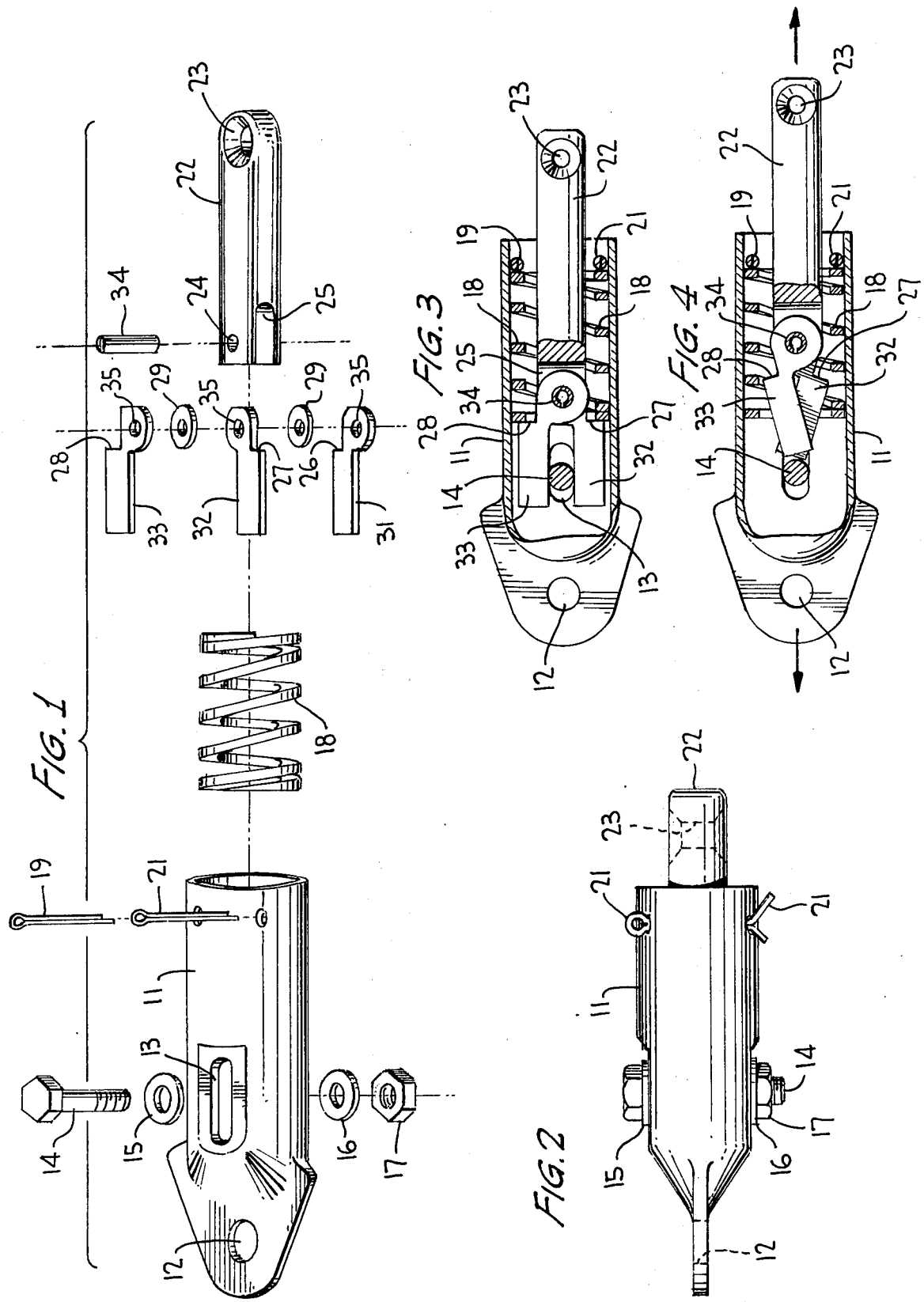

LOAD ADJUSTABLE RELEASE DEVICE

GOVERNMENT USE

The invention described herein may be manufactured, used, and licensed by or for the Government for Governmental purposes without the payment to me of any royalties thereon.

FIELD OF THE INVENTION

This invention relates to devices for securing segments of ropes and, more particularly, for providing separation of a rope when a predetermined tensile force is applied thereto.

DESCRIPTION OF THE PRIOR ART

The United States patent to Den Besten U.S. Pat. No. 963,501 discloses structure that operates in a way that is similar to the operation of the present invention. Lacking in Den Besten is the orientation and exact structural elements that enable the instant invention to operate with a very high degree of precision to maintain the connected state nearer to the damage limit and effect the disconnected state within the tolerance limit.

SUMMARY OF THE INVENTION

A quick release device is installed as a section of a rope subjected to tensile forces. The device maintains a connected state until a predetermined amount of tensile force is applied thereto. Connection is provided by a plurality of jaws pivoted on a plunger that compresses one end of a spring within a housing. Extension arms integral with the jaws are separated by an adjustable detent. The opposing tensile forces are applied to the second end of the spring affixed to the housing and compressed by the jaws. When the tensile forces are sufficient to move the extensions past the detent, the jaws are forced by the spring to an orientation whereby they no longer confine the spring, but slide therethrough to provide a state of disconnection.

It is, therefore, an object of this invention to provide a means for a breakaway or lease between two connected objects when a preset tensile force is exceeded. Another object of this invention is to provide a self-actuating, adjustable breakaway device to protect not only the ropes or cables involved, but the object secured by such rope. Still another object of this invention is to provide a resettable quick release device which can have use after a disconnect.

Yet another object of this invention is to provide a quick release device capable of a very high degree of precision in maintaining a connected state very near to the damage limit.

A further object of this invention is to provide a quick release device capable of effecting the disconnected state within the tolerance limit.

These and other objects will be apparent from the following specifications and drawings in which:

BRIEF DESCRIPTION OF THE DRAWINGS

FIG. 1 shows an exploded view of all the parts of the invention,

FIG. 2 is a side view of the assembled invention,

FIG. 3 shows a cutaway drawing of the relationship of the parts in connected condition, and FIG. 4 shows a cutaway drawing of the relationship of the parts just after release.

DESCRIPTION OF A PREFERRED EMBODIMENT

Turning now to FIG. 1 a tubular house 11 is provided at one end with a flange having an aperture means 12 for securing a rope or cable. Slot means 13 are provided in the top and bottom of the tubular housing 11 with the longitudinal axes thereof beng parallel to the central axis of housing 11. Into slots 13 is inserted a bolt means 14 which is provided with a pair of washers 15 and 16 separating bolt head of bolt 14 and a nut 17 from the housing 11. Easy adjustability is thus afforded for the securing of the bolt at a predetermined place in slot 13 as determined by the breakaway tensile strength to be applied to the device. A spring 18 is mounted inside housing 11 and is secured by securing means such as cotter pins 19 and 21 secured through apertures near the open end of housing 11.

A plunger 22 is provided at one end with an aperture means 23. Through aperture 23 is connected a second rope or cable whereby the tensile forces are applied through the two ropes. At the other end of plunger 22 is a second aperture means 24 and a slot means 25. Into slot means 25 are placed jaw means 26, 27 and 28 with a pair of spacer washers 29 to separate jaws 26 and 28 from jaw 27. Extension 31 of jaw 26, extension 32 of jaw 27 and extension 33 of jaw 28 when installed in a connected state, impinge on the sides of bolt 14 to position jaws 26, 27, and 28 securely on the inner end of spring 18 to deliver compressive forces thereto. A pivot pin 34 is placed through aperture means in the ends of jaws 26, 27 and 28 opposite to the extensions 31, 32 and 33.

FIG. 2 shows the assembled quick release device of this invention. A rope is tied through aperture means 12 and another rope is tied through aperture means 23, each rope providing tensile forces along the axis of the device in opposing directions.

FIG. 3 shows the device with the detent bolt 14 being adjusted in a predetermined position in slots 13. The extensions 33 and 32 of jaws 28 and 27 respectively are shown pressing against detent 14 under the effectiveness of compression spring 18 pressing against jaws 28 and 27. In this connected state, the tensile force applied by ropes or cables attached at apertures 12 and 23 can decrease to make spring 18 move the extensions toward aperture means 12. If the tensile forces increase, the extensions have a predetermined distance to move against spring 18 before they are free from contact with detent 14. When the tensile forces are sufficient for such free condition to exist, the spring 18 will cause jaws 28 and 27 to pivot about axis 34. The jaws are then free to move within spring 18 out of the housing 11 to effect a disconnected state.

Jaw 26 and its extension 31 are not visible in FIGS. 3 and 4, but act in concert with jaws 27 and 28. It is seen that the device could operate with just one jaw means or with two jaws. Three jaws eliminate all twisting and skewing problems. The stiffness of the compression spring 18 determines the release limits.

To reset the device after a disconnect has occurred, the keeper bolt 14 is removed and the plunger 22 with its jaws 26, 27 and 28 are inserted into housing 11 and spring 18. When the jaws clear the inner end of spring 18, the extensions are separated and the keeper 14 is inserted with each extension on a side of the keeper to position the jaws in their spring holding orientation. When the keeper is properly installed and a position along slot 13 is selected to enable the device to disconnect at a predetermined pull force, the keeper bolt is then tightened and the device is again ready for use.

Inasmuch as many changes could be made in the above construction, and many apparently widely different embodiments of my invention could be made without departing from the scope thereof, it is intended that all matter contained in the above description or shown in the accompanying drawing shall be interpreted as illustrative and not in a limiting sense. It is also to be understood that the language contained in the following claims is intended to cover all the generic and specific features of the invention herein described and all statements of the scope of the invention which, as a matter of language, might be said to fall there between.

What is claimed is:

1. A line coupler means which automatically decouples when a selected line tension is exceeded comprising:

a tubular housing means having a first line attachment means at a first end thereof and open ended at the second end thereof and having a selected longitudinal axis;

a compression means disposed within said housing means, said compression means having an elongated hollow center configuration and disposed with said hollow center substantially in alignment with said axis of said housing such that said compression means is adapted for compression along said axis of said housing;

tubular plunger means disposed within said hollow center of said compression means and adapted for axial movement therein, said tubular plunger means having a second line attachment means at a first end thereof, said first end of said plunger means disposed in the vicinity of said second end of said housing means such that a tension force may be applied across said first end of said housing means and said first end of said plunger means of said line coupler means;

restraining means attached to said housing means substantially at said second end thereof and adapted to restrain said compression means within said housing means when a tension force is applied across said line coupler means;

at least one jaw hook means attached to the second end of said tubular plunger means within said housing, said jaw hook means having an elongated shank portion with one end thereof attached to said plunger means and a transverse extension at the other end of said shank portion, said jaw hook means adapted for disposition in a first position and for disposition in a second position within said housing means, said transverse extension of said jaw hook means adapted to engage the end of said compression means opposite said restraining means in said jaw hook means first position, said transverse extension of said jaw hook means adapted to enable withdrawal of said plunger means and attached jaw hook means through said hollow of said compression means in said second position of said jaw hook means;

and compression release means adapted to maintain said jaw hook means in said first position until said compression means reaches a predetermined compression state representative of the tension force applied across said line coupler whereby release of said compression means actuates movement of said jaw hook means from said first position to said second position thereof and said tubular housing means and said tubular plunger means are pulled apart by the tension force applied and become separate elements of said line coupler means.

2. A line coupler means as defined in claim 1 wherein said compression means is a compression coil spring and said compression release means is a transverse member diametrically disposed within said tubular housing means in orthogonal relation to said selected longitudinal axis of said tubular housing means, said transverse member being disposed such that until said predetermined compression state of said compression means is exceeded, said shank portion of said jaw hook means and said transverse member are in a physical contact relation which precludes movement of said jaw hook means from said first position to said second position thereof.

3. A line coupler as defined in claim 2 wherein said transverse member is a transverse post.

4. A line coupler as defined in claim 2 wherein said tubular housing means is adapted to permit variable placement of said transverse member for purpose of adjustment of the magnitude of the tensile force applied across said line coupler required to actuate release of said compression means.

5. A line coupler as defined in claim 4 wherein said tubular housing means includes a slotted wall section with the slot therein in alignment with said longitudinal axis thereof and said transverse member is selectively mounted in said slotted wall section.

6. A line coupler as defined in claim 5 wherein said transverse member is a transverse post and at least three jaw hook means are attached to said second end of said tubular plunger means.

* * * * *